(12) United States Patent
Cantwell et al.

(10) Patent No.: US 9,910,430 B2
(45) Date of Patent: Mar. 6, 2018

(54) K-NEAREST NEIGHBOR-BASED METHOD AND SYSTEM TO PROVIDE MULTI-VARIATE ANALYSIS ON TOOL PROCESS DATA

(71) Applicant: Applied Materials, Inc., Santa Clara, CA (US)

(72) Inventors: Dermot Cantwell, Sunnyvale, CA (US); Thorsten Kril, Santa Clara, CA (US); Aleksey Yanovich, Campbell, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 551 days.

(21) Appl. No.: 13/974,915

(22) Filed: Aug. 23, 2013

(65) Prior Publication Data

US 2015/0057788 A1  Feb. 26, 2015

(51) Int. Cl.
*G05B 23/02* (2006.01)

(52) U.S. Cl.
CPC .................. *G05B 23/024* (2013.01)

(58) Field of Classification Search
CPC .. G05B 23/02; G05B 23/024; G05B 23/0205; G05B 23/0218; G05B 23/0237; G05B 23/0259; G05B 23/0275; G05B 2219/45031; G05B 19/4184
See application file for complete search history.

(56) References Cited

U.S. PATENT DOCUMENTS

| | | |
|---|---|---|
| 6,650,955 B1 | 11/2003 | Sonderman et al. |
| 7,043,403 B1 | 5/2006 | Wang et al. |
| 7,113,842 B2 | 9/2006 | O'Leary et al. |
| 8,103,478 B2 | 1/2012 | Good et al. |

(Continued)

FOREIGN PATENT DOCUMENTS

| | | |
|---|---|---|
| TW | 2015-23311 A | 8/2013 |
| WO | 2015/027063 A1 | 2/2015 |

OTHER PUBLICATIONS

Q. Peter He et al., "Fault Detection Using the k-Nearest Neighbor Rule for Semiconductor Manufacturing Process," IEEE Transactions on Semiconductor Manufacturing, vol. 20, No. 4, Nov. 2007, 10 pages.

(Continued)

*Primary Examiner* — Nathan L Laughlin
(74) *Attorney, Agent, or Firm* — Lowenstein Sandler LLP

(57) ABSTRACT

A server computer system creates a reference fingerprint for a first tool running a recipe. The server computer system uses reference data that pertains to the first tool performing within parameters to create the reference fingerprint. The reference fingerprint includes a target baseline and allowable ranges based on the target baseline. The server computer system determines whether sample data that is associated with a second tool running the recipe is performing within the parameters based on a comparison of the sample data to the reference fingerprint. The second tool can be the first tool or another tool of a same type as the first tool. The server computer system provides a classification of the second tool (Continued)

to at least one of a system or a user based on the comparison of the sample data to the reference fingerprint. The classification indicates whether the second tool is performing within the parameters.

20 Claims, 9 Drawing Sheets

(56) References Cited

U.S. PATENT DOCUMENTS

| | | | | |
|---|---|---|---|---|
| 8,145,444 | B1* | 3/2012 | Bickford | G05B 23/0235 |
| | | | | 702/179 |
| 2002/0002414 | A1* | 1/2002 | Hsiung | G05B 15/02 |
| | | | | 700/95 |
| 2002/0055801 | A1* | 5/2002 | Reiss | G05B 19/41865 |
| | | | | 700/111 |
| 2005/0286753 | A1* | 12/2005 | Ho | H04N 17/04 |
| | | | | 382/141 |
| 2006/0042753 | A1* | 3/2006 | O'Leary | G05B 23/0237 |
| | | | | 156/345.1 |
| 2006/0180570 | A1* | 8/2006 | Mahoney | H01J 37/32935 |
| | | | | 216/59 |
| 2006/0184264 | A1 | 8/2006 | Willis et al. | |
| 2007/0004061 | A1* | 1/2007 | Velidandla | G01N 21/55 |
| | | | | 438/16 |
| 2009/0030632 | A1 | 1/2009 | Tallavarjula et al. | |

OTHER PUBLICATIONS

Ghislain Verdier et al., "Adaptive Mahalanobis Distance and k-Nearest Neighbor Rule for Fault Detection in Semiconductor Manufacturing," IEEE Transactions on Semiconductor Manufacturing, vol. 24, No. 1, Feb. 2011, 10 pages.

International Search Report and Written Opinion dated Nov. 28, 2014 for International Application No. PCT/US2014/052088.

Extended European Search Report for E.P. Application No. 14838723.6-1802 / 3036655 dated Apr. 3, 2017 3 pages.

* cited by examiner

K-NEAREST NEIGHBOR-BASED METHOD AND SYSTEM TO PROVIDE MULTI-VARIATE ANALYSIS ON TOOL PROCESS DATA

TECHNICAL FIELD

Implementations of the present disclosure relate to analyzing tool process data, and more particularly, to provide multi-variate analysis on tool process data using a k-nearest neighbor-based method.

BACKGROUND

In the semiconductor industry, there is a vast amount of sensor data for the various tools running recipes. Typically, the sensor information is raw data, which generally may not be helpful to some users, such as process engineers, etc. The large amount of data can often times be difficult to manage. Some solutions use a statistical approach, such as PCA (principal component analysis), to attempt to transform the raw data into meaningful data for users. However, the unique characteristics of the semiconductor processes, such as non-linearity in batch processes, process steps with variable duration, etc., have posed some difficulties in the PCA-based solutions.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" implementation in this disclosure are not necessarily to the same implementation, and such references mean at least one.

DETAILED DESCRIPTION

Implementations of the disclosure are directed to a method and system for performing a k-nearest neighbor-based analysis on tool process data. For brevity and simplicity, a chamber is used as an example of a tool throughout this document. Implementations of the disclosure modify a k-Nearest Neighbor (kNN) algorithm to assist in data analysis, for example, for chamber matching and control on process chambers. A server computer system can collect data for multiple runs of a recipe on a chamber and data for multiple sensors for the runs and can create a single value, herein after referred to as a "process index", which describes each run. The process index is an indicator of how a run of a recipe on a chamber compares to known good runs of the recipe on the same chamber and/or on chambers of the same type. The process index also describes how the sensors relate to the known good runs. The process index can be used to determine which sensors may be causing a chamber matching issue.

A server computer system can create a reference fingerprint for a tool (e.g., chamber) running a recipe. The server can use reference data, which pertains to the tool performing as expected (e.g., within parameters associated with running the recipe), to create a target baseline and one or more allowable ranges based on the target baseline from the reference data. The target baseline and the one or more allowable ranges can make up the reference fingerprint. The server computer system can determine whether sample data, which is associated with the same tool or other tools of the same type and is running the same recipe, indicates that a tool is performing as expected (e.g., within the parameters) based on a comparison of the sample data to the reference fingerprint. The server computer system can provide a classification of the tool being analyzed to a system or a user based on the comparison of the sample data to the reference fingerprint. The classification can indicate whether the tool/recipe combination that is being analyzed is operating as normal.

Figure 1:
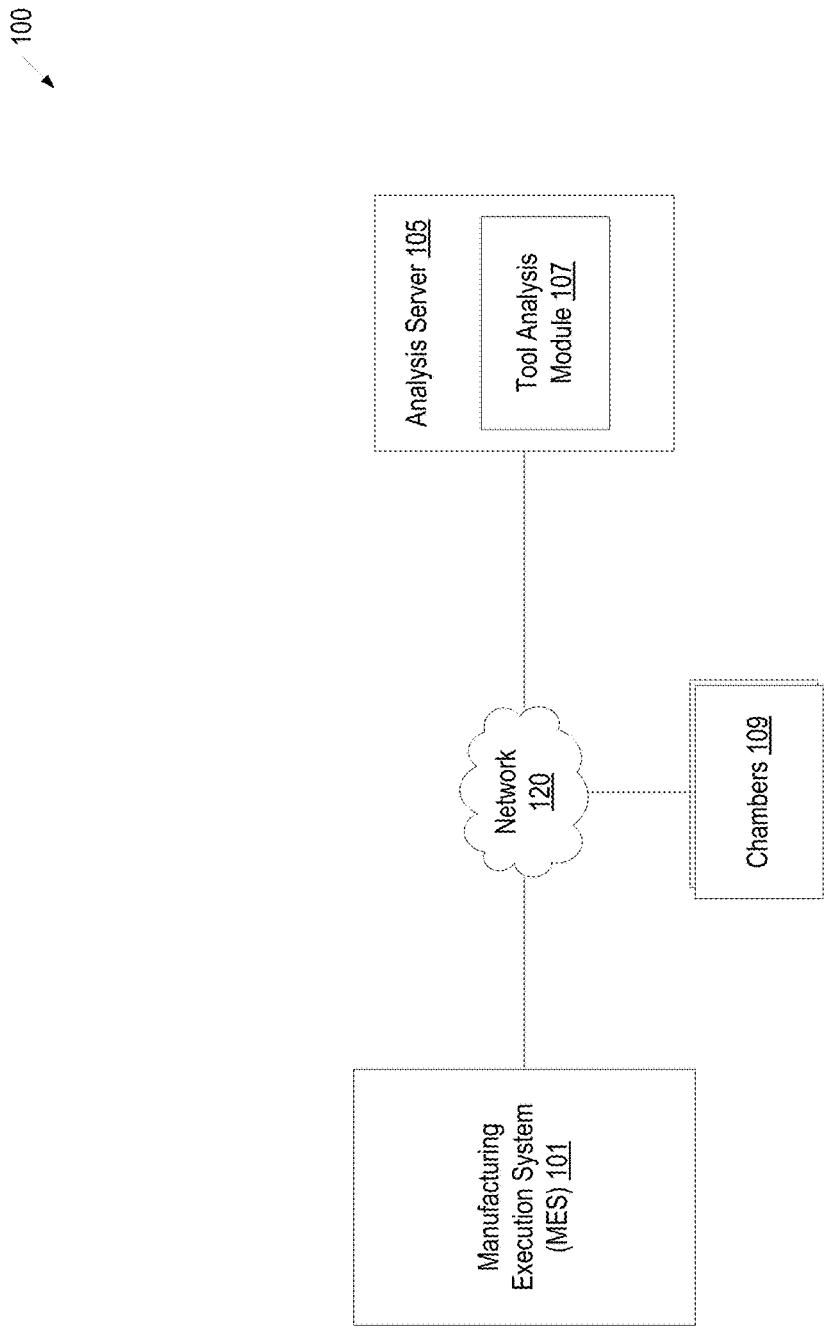
FIG. 1 is a block diagram illustrating a system utilizing a tool analysis module.

FIG. 1 is a block diagram illustrating a manufacturing system 100 including a fabrication system data source (e.g., manufacturing execution system (MES) 101), one or more tools (e.g., chambers 109), and an analysis server 105 communicating, for example, via a network 120. The network 120 can be a local area network (LAN), a wireless network, a mobile communications network, a wide area network (WAN), such as the Internet, or similar communication system.

The MES 101, analysis server 105, and tool analysis module 107 can be individually hosted by any type of computing device including server computers, gateway computers, desktop computers, laptop computers, tablet computer, notebook computer, PDA (personal digital assistant), mobile communications devices, cell phones, smart phones, hand-held computers, or similar computing device. Alternatively, any combination of MES 101, analysis server 105, and tool analysis module 107 can be hosted on a single computing device including server computers, gateway computers, desktop computers, laptop computers, mobile communications devices, cell phones, smart phones, hand-held computers, or similar computing device.

The analysis server 105 can collect and analyze data relating to chambers 109. In one implementation, the analysis server 105 is coupled to a factory system data source (e.g., MES 101, ERP (Enterprise Resource Planning) system, etc.) to receive lot data and equipment (e.g., chamber) data, etc. In one implementation, the analysis server 105 receives data directly from a chamber 109. The analysis server 105 can include a tool analysis module 107 to use reference data representing chambers 109 that are performing as expected and real-time data of running recipes on the chambers 109 to determine whether the chambers 109 are deviating from the expected performance for running particular recipes.

The tool analysis module 107 can use data from a chamber that is performing as expected for a given recipe to create a reference fingerprint for the chamber for the given recipe. The tool analysis module 107 can compare sample data for the chamber running the recipe, as well as sample data for other chambers running the recipe, to the reference fingerprint to evaluate the performance and/or health of the chambers. When a chamber that is running the given recipe is not performing as expected in comparison to the reference fingerprint, the tool analysis module 107 can provide additional data for the chamber, runs on the chamber, and/or sensors on the chamber that describes the which sensors and/or recipe attributes contribute to any deviation. In one implementation, the tool analysis module 107 classifies chambers 109 that deviate from the parameters of the reference fingerprint as 'not normal' or 'abnormal' and classifies the chambers 109 that are within the parameters of the reference fingerprint as 'normal'. In one implementation, the tool analysis module 107 determines a degree for a classification. For example, the tool analysis module 107 may further classify chambers that are abnormal as 'high', 'medium', or 'low' depending on the magnitude of the deviation of the sample data for the chamber from the reference fingerprint. The tool analysis module 107 can provide the chamber classification (e.g., normal, not normal, high, medium, low, etc.) to a user (e.g., process engineer, system engineer, industrial engineer, system administrator, etc.) and/or system (e.g., maintenance system, etc.).

Figure 2:
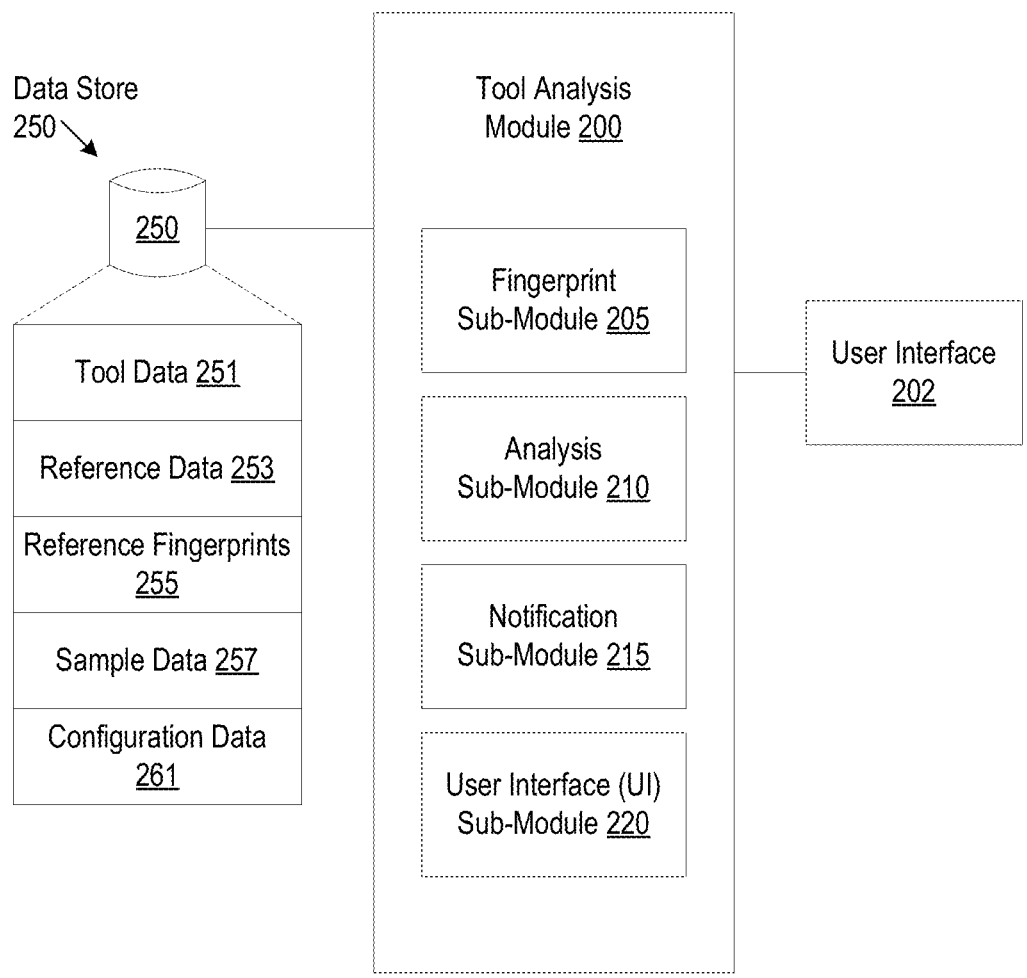
FIG. 2 a block diagram of one implementation of a tool analysis module.

FIG. 2 is a block diagram of one implementation of a tool analysis module 200. The tool analysis module 200 can be the same as the tool analysis module 107 of FIG. 1. The tool analysis module 200 can include a fingerprint sub-module 205, an analysis sub-module 210, a notification sub-module 215, and a user interface (UI) sub-module 220.

The tool analysis module 200 can be coupled to one or more data stores 250. The data stores 250 can be persistent storage units. A persistent storage unit can be a local storage unit or a remote storage unit. Persistent storage units can be a magnetic storage unit, optical storage unit, solid state storage unit, electronic storage unit (main memory) or similar storage unit. Persistent storage units can be a monolithic device or a distributed set of devices. A 'set', as used herein, refers to any positive whole number of items.

The data stores 250 can store tool data 251 for one or more tools (e.g., chambers). The tool data 251 can include data describing the recipes being run on the corresponding tool and the sensors for the corresponding tool. The tool data 251 can be provided by the tools (e.g., chambers) and/or a system (e.g., MES) in the manufacturing site.

The fingerprint sub-module 205 can use a modified k-nearest neighbor algorithm to create reference fingerprints 255 that correspond to chambers and/or chamber types that are running particular recipes. The fingerprint sub-module 205 can identify a subset of the tool data 251 which corresponds to 'good' runs of running a particular recipe on chambers of the same type. A 'good' run or a 'normal' run hereinafter refers to a run for the particular recipe that performs as expected on a chamber, for example, within the expected parameters. A 'bad' run or 'abnormal' run hereinafter refers to a run for the particular recipe that does not perform as expected on a chamber, for example, is not within the expected parameters. The fingerprint sub-module 205 can use the tool data 251 for the good runs as reference data 253. The reference data 253 can include, and is not limited to, a chamber identifier, a chamber type, a recipe identifier, a number of runs on the chamber, run identifiers, sensor identifiers, sensor data for the sensors, etc. The reference data 253 can be stored in the data store 250. The data store 250 can store configuration data 261 that specifies the number of good runs that the fingerprint sub-module 205 should use to create the reference fingerprints 255. For example, the configuration data 261 may specify that data from fifty good runs should be used to create the reference fingerprints 255. The configuration data 261 can be configurable and user (e.g., system administrator, process engineer, etc.) defined.

The fingerprint sub-module 205 can compute a target baseline and one or more ranges related to the target baseline from the reference data 253. The target baseline and one or more ranges related to the target baseline can make up a reference fingerprint 255. The reference fingerprint 255 can be used for the same types of chambers. One implementation of creating a reference fingerprint is described in greater detail below in conjunction with FIG. 5.

Figure 3:
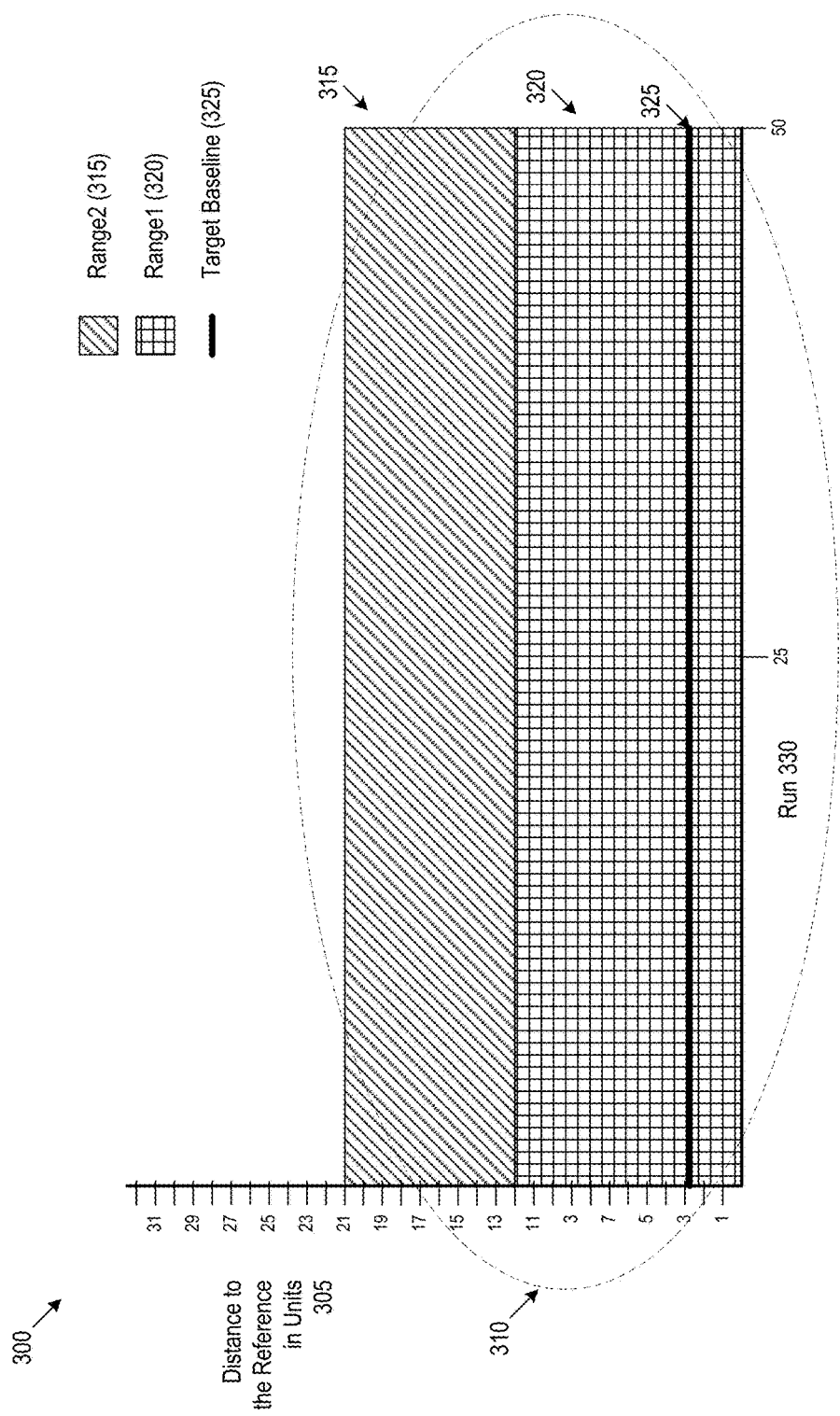
FIG. 3 illustrates an example graphical user interface including a reference fingerprint, according to various implementations.

FIG. 3 illustrates an example graphical user interface (GUI) 300 including a reference fingerprint 310, according to various implementations. The reference fingerprint 310 includes a value for a target baseline 325 (e.g., value 2.8) and one or more allowable ranges (e.g., Range1 320 and Range2 315). One implementation of determining the target baseline and ranges is described in greater detail below in conjunction with FIG. 5. In one implementation, a sample is classified as being normal if the sample is within the ranges (e.g., Range1 320 and Range2 315) of the target baseline 325. A 'sample' or 'sample run' hereinafter refers to run of a particular recipe on a chamber where it is unknown whether the run is a normal run or an abnormal run pertaining to an expected performance. In one implementation, Range1 320 is a 3-sigma (3 standard deviations) band for the target baseline 325 and Range2 315 is a 6-sigma (6 standard deviations) band for the target baseline 325. The GUI 300 can include an x-axis that describes the runs 330 used to create the reference fingerprint 310. For example, the reference data 253 may include data for fifty good runs. The GUI 300 can include a y-axis that describes distance (e.g., distance to the reference in units 305) between data being analyzed and the reference fingerprint.

Returning to FIG. 2, the data store 250 can store sample data 257 for one or more samples (sample runs). The sample data 257 can include, and is not limited to, a chamber identifier, a chamber type, a recipe identifier, a run identifier, sensor identifiers, sensor data for the sensors, etc.

The analysis sub-module 210 can use the sample data 257 for a particular run to create a sample vector, S, to describe the sensor readings for the corresponding run. The sample vector S can be a row vector with m elements, where each element corresponds to a sensor reading for the particular run. The analysis sub-module 210 can use the sample vector S to determine a process index for the sample run. One implementation of determining a process index for a sample run is described in greater detail below in conjunction with FIG. 7. The analysis sub-module 210 can compare the process index for the sample run to the target baseline and ranges of the reference fingerprint 255 to determine whether the sample data 257 for the sample classifies the particular chamber/recipe combination that corresponds to the sample data 257 as normal or abnormal. One implementation of determining whether to classify a sample run for a particular chamber/recipe combination as normal or abnormal is described in greater detail below in conjunction with FIG. 7.

The user interface (UI) sub-module 220 can provide a user interface 202 that includes a comparison of the process index for multiple runs to a reference fingerprint. 255. The user interface 202 can be a graphical user interface (GUI).

Figure 4:
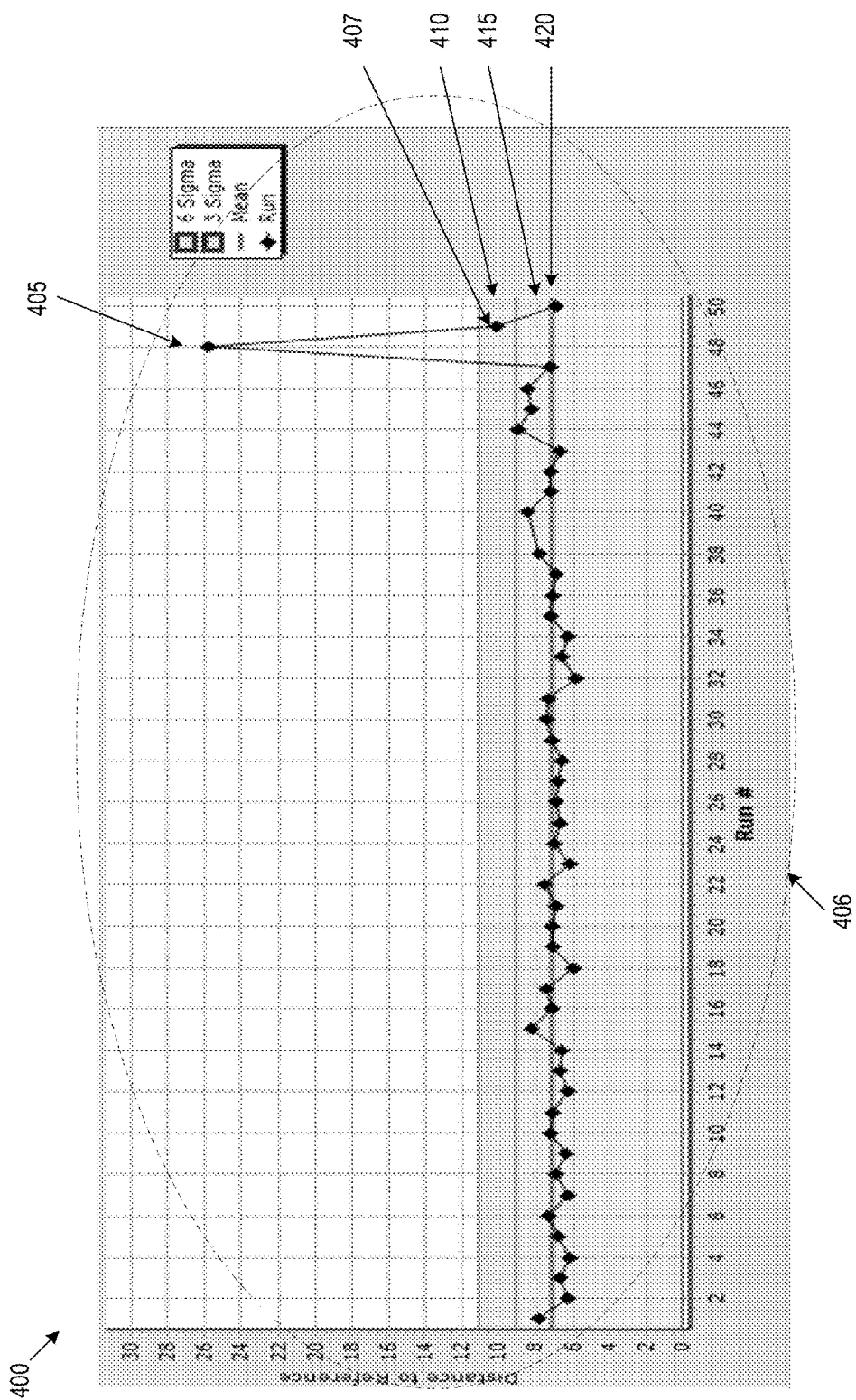
FIG. 4 illustrates an example graphical user interface including a comparison of the process index for multiple runs to the reference fingerprint, according to various implementations.

FIG. 4 illustrates an example graphical user interface 400 including a comparison of the process index for multiple runs to the reference fingerprint, according to various implementations. The reference fingerprint can include a value for a target baseline 420 (e.g., 7), a first range 415 (e.g., 3-sigma band) and a second range 410 (e.g., 6-sigma band). The GUI 400 can include data points 406 to represent the process indexes for the sample runs. In one implementation, a sample run is classified as being normal if the corresponding process index (e.g., data point) is within the ranges 410,415 of the target baseline 420, and is classified as being abnormal if the corresponding process index (e.g., data point) is not within the ranges 410,415 of the target baseline 420. For example, the data point 405, which represents the process index for sample Run-48, is outside the allowable ranges 410,415 for the reference fingerprint, and Run-48 may be classified as abnormal. The data for Run-48 can be further analyzed to determine which sensors may be contributing to Run-48 being outside the allowable ranges 410,415. In another example, the data point 407, which represents the process index for sample Run-49, is within the allowable ranges 410,415 for the reference fingerprint, but is within the 6-sigma band. The data for Run-49 may be further analyzed to determine which sensor may be contributing to Run-49 being within the 6-signma band.

Returning to FIG. 2, the notification sub-module 215 can provide a classification notification indicating whether the sample data 257 for a corresponding chamber/recipe combination is normal or abnormal. The notification sub-module 215 can provide the classification notification via the user interface 202, via a message and the network, etc. The notification sub-module 215 can provide the classification notification, for example, to a user (e.g., process engineer, industrial engineer, system engineer, system administrator) and/or system (e.g., reporting system, scheduler, etc.).

In one implementation, the tool analysis module 200 groups data by sensor and/or by process step. For example, the tool analysis module 200 may group the tool data 251 by sensor and/or by process step. In another example, the tool analysis module 200 may group the reference data 253 by sensor and/or by process step. In another example, the tool analysis module 200 may group the sample data 257 by sensor and/or by process step. In another example, the tool analysis module 200 may group any combination of data by sensor and/or by process step. By grouping the data, the tool analysis module 200 can determine whether a classification of being abnormal is attributed to one sensor on all process steps, one step only, or different sensors on different steps. In one implementation, the tool analysis module 200 determines a pareto distribution of data. For example, if there are many runs and/or sensors that have data that fall outside the parameters of the reference fingerprint, the tool analysis module 200 can identify a subset (e.g., top 10, top 20, etc.) of the runs and/or sensors that have data that falls outside the parameters of the reference fingerprint. The pareto distribution may indicate that the subset is outside the parameters of the reference fingerprint due to one sensor.

Figure 5:
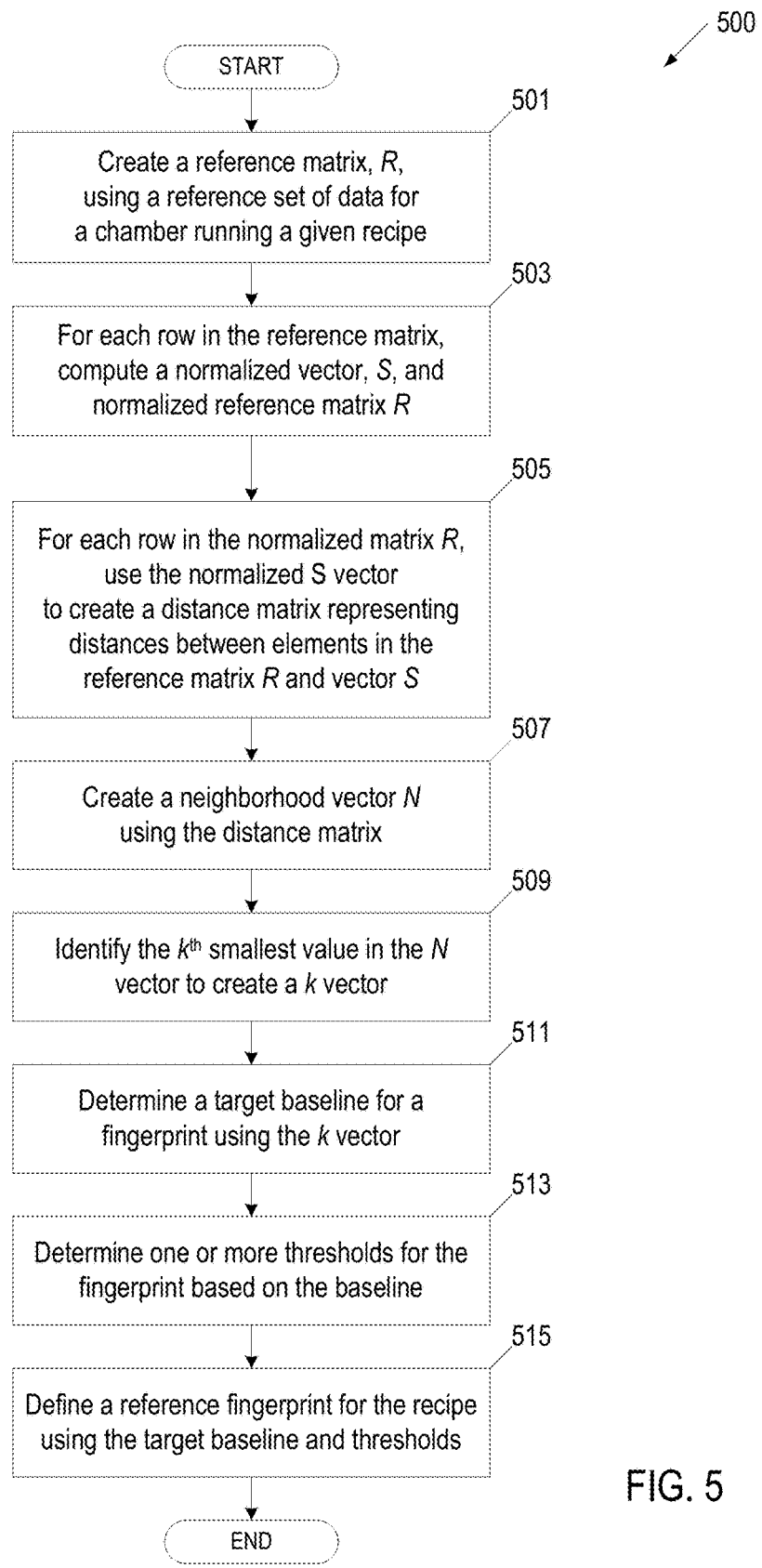
FIG. 5 illustrates one implementation of a method for creating a reference fingerprint using a k-nearest neighbor-based analysis.

FIG. 5 illustrates one implementation of a method for creating a reference fingerprint using a k-nearest neighbor-based analysis. Method 500 can be performed by processing logic that can comprise hardware (e.g., circuitry, dedicated logic, programmable logic, microcode, etc.), software (e.g., instructions run on a processing device), or a combination thereof. In one implementation, method 500 is performed by the tool analysis module 107 in server 105 of FIG. 1.

At block 501, the server creates a reference matrix, R, for a tool (e.g., chamber) running a given recipe. The reference matrix R can be created from reference data that includes data for multiple good runs. The reference matrix R can include n rows by m columns, where n is the number of good runs in the reference data and m is the number of sensors for the corresponding runs.

$$\text{matrix } R = \begin{bmatrix} r_{1,1} & \cdots & r_{1,m} \\ \vdots & \ddots & \vdots \\ r_{n,1} & \cdots & r_{n,m} \end{bmatrix} \text{ where } n = \text{runs}, m = \text{sensors} \quad \text{Statement 1}$$

For each row (run) in the reference matrix R, the server can let the row represent a vector, S, to describe the sensor readings for the corresponding run. The vector S can be a row vector with m elements, each element corresponding to a sensor reading for the particular run.

$$\text{vector } S = [r_{z,1} \ldots r_{z,m}] \quad \text{Statement 2}$$

where z is the run number, z being from 1 to n,
m=sensor, and S is a row in the reference matrix R At block 503, for each row in the reference matrix R, the server computes the normalized S vector and normalized reference matrix R based on the reference data mean and standard deviation for each sensor in the reference set.

At block 505, for each row in the normalized R matrix, the server uses the normalized S vector to create a distance matrix, D, and uses the distance matrix D to create a neighborhood vector, N, at block 507.

$$\text{matrix } D = \begin{bmatrix} d_{1,1} & \cdots & d_{1,m} \\ \vdots & \ddots & \vdots \\ d_{n,1} & \cdots & d_{n,m} \end{bmatrix} \text{ where } n = \text{runs}, m = \text{sensors} \quad \text{Statement 3}$$

Figure 6:
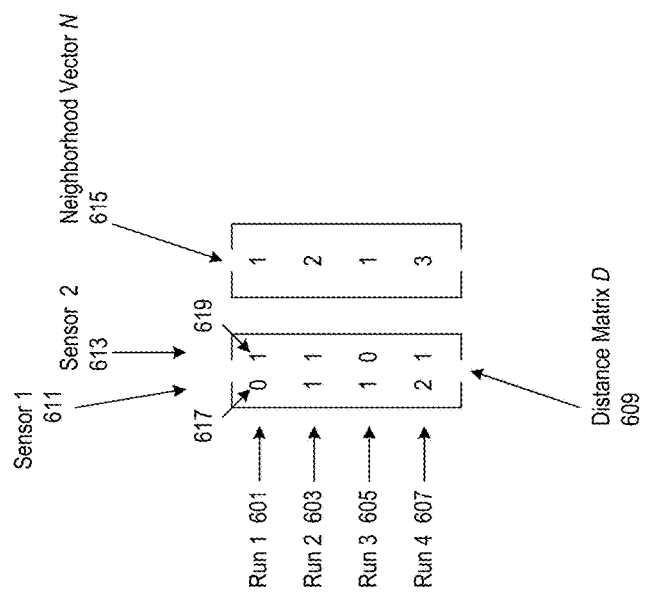
FIG. 6 illustrates an example of a distance matrix and an example of a neighborhood vector, according to various implementations.

FIG. 6 illustrates an example of a distance matrix D 609 and an example of a neighborhood vector N 615, according to various implementations. The distance matrix D 609 can be an n row by m column matrix. Each row in the distance matrix D 609 can represent a run (e.g., Run 1 601, Run 2 603, Run 3 605, Run 4 607) and each column in the distance matrix D 609 can represent a sensor (e.g., Sensor 1 611, Sensor 2 613. Each element in distance matrix D 609 can represent a distance unit (e.g., distance unit 617, distance unit 619) describing the distance between the corresponding element in the vector S and the reference matrix R. In one implementation, each element (e.g., distance unit 617, distance unit 619) in distance matrix D 609 is the squared distance between the corresponding element in the vector S and the reference matrix R. For example, the distance unit 617 for Sensor 1 611 for Run 1 601 may have a value of zero, which indicates that Sensor 1 in Run 1 is zero units away from the corresponding element in the reference matrix R. In another example, the distance unit 619 for Sensor 2 613 for Run 1 601 may have a value of one, which indicates that Sensor 2 in Run 1 is one unit away from the corresponding element in the reference matrix R. The neighborhood vector, N, can be an n element column vector, where each element is the sum of the row in the corresponding distance matrix, D.

Returning to FIG. 5, at block 509, the server uses a k-nearest neighbor value (e.g., k=3) to identify the $k^{th}$ smallest value (nearest neighbor value) in the N vector to create a k vector of values for each sample in the reference data. The server can store the identified nearest neighbor values as a k vector in the data store. The server can identify the nearest neighbor value by sorting the elements in the neighborhood vector N from smallest to largest value. For example, the neighborhood vector N 615 in FIG. 6 [1, 2, 1, 3] can be sorted as [1, 1, 2, 3]. The server can determine the value that corresponds to the k-position in the sorted neighborhood vector N as the $k^{th}$ smallest value (nearest neighbor value). For example, for k=3, the server determines that "2" is in the third position (e.g., k=3) and is the $k^{th}$ smallest value (nearest neighbor value). The server creates a k vector of values for each sample in the reference data. The k vector can describe how all sensors relate to the corresponding sensors for the other runs in the reference data. The k value (e.g., k=3) that should be used by the server can be specified in the configuration data.

At block 511, the server determines the mean of the k vector as a target baseline for any sample to match the m-dimensional distribution of the sensors. The target baseline is used to define the reference fingerprint. At block 513, the server determines one or more thresholds (e.g., one or more standard deviations) of the k vector to define one or more allowable ranges for the reference fingerprint. At block 515, the server defines a reference fingerprint as the target baseline and the thresholds.

Figure 7:
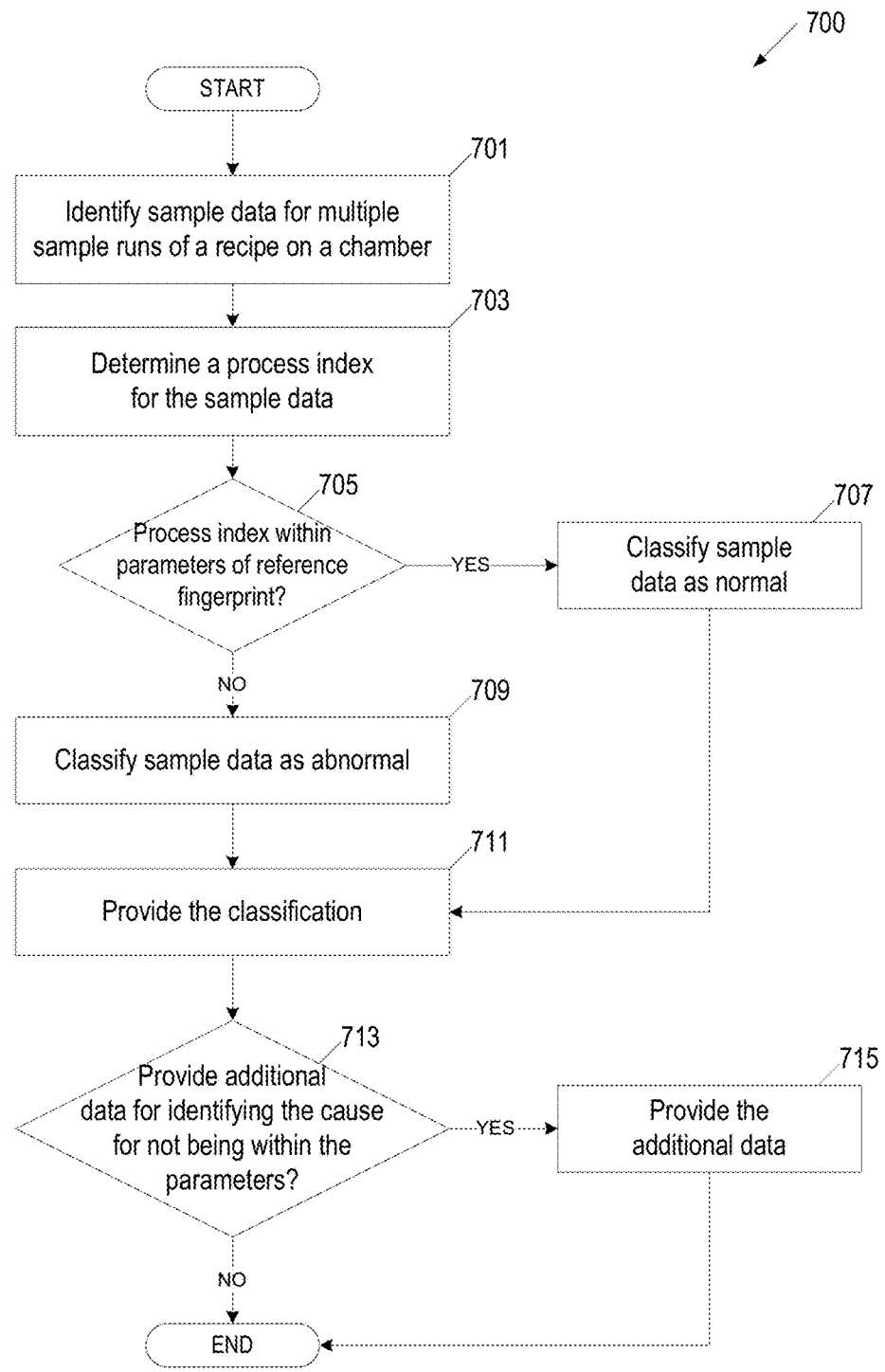
FIG. 7 illustrates one implementation of a method for performing a k-nearest neighbor-based analysis on tool process data.

FIG. 7 is a flow diagram of an implementation of a method 700 for performing a k-nearest neighbor-based analysis on tool process data. Method 700 can be performed by processing logic that can comprise hardware (e.g., circuitry, dedicated logic, programmable logic, microcode, etc.), software (e.g., instructions run on a processing device), or a combination thereof. In one implementation, method 700 is performed by the tool analysis module 107 in server 105 of FIG. 1.

At block 701, the server identifies sample data for multiple sample runs of a recipe on a chamber. A sample run is a run of a particular recipe on a chamber where it is unknown whether the run is a normal run or an abnormal run. The sample data can be based on input of a user selection via a GUI. For example, a user may select the last fifty runs (e.g., Run-1 to Run-50) on Chamber-X for Recipe-XYZ to be analyzed. The sample data can be stored in a data store that is coupled to the tool analysis module. Method 700 or one or more portions of method 700 can be iterative. The number of iterations can be based on the number of sample runs that are to be analyzed.

At block 703, the server determines a process index for the sample data. The server can use the sample data to create a sample vector, S, to describe the sensor readings for the corresponding sample run. The sample vector S can be a row vector with m elements, each element corresponding to a sensor reading for the particular sample run.

sample vector $S=[s_1 \ldots s_m]$   Statement 4 where m=sensor and S is the sample run under analysis

The server can compute the normalized sample vector S against a reference matrix R. The server can use the normalized sample vector S to create a distance matrix, D, for the sample runs. The distance matrix D can be an n row by m column matrix, where each element is the squared distance between the corresponding element in the sample vector S and the reference matrix R. Each row in distance matrix D is a sample run. Each column in the distance matrix D is a sensor. The server can use the distance matrix D to compute a neighborhood vector, N. The neighborhood vector, N, can be an n element column vector, where each element is the sum of the row in the corresponding distance matrix, D. The server can use a k value (e.g., k=3) to identify the $k^{th}$ smallest value (nearest neighbor value) in the N vector. The $k^{th}$ smallest value (nearest neighbor value) in the N vector is the process index for the chamber for the given recipe. The k value (e.g., k=3) that should be used by the server can be specified in configuration data that is stored in a data store that is coupled to the tool analysis module.

At block 705, the server determines whether the process index for sample data for the chamber/recipe combination is within the parameters of the reference fingerprint. If the process index is within parameters of the reference fingerprint, the server classifies the sample data for the chamber/recipe combination as normal at block 707, and provides the classification, for example, to a user (e.g., process engineer, industrial engineer, system engineer, system administrator) and/or system (e.g., reporting system, scheduler, etc.) at block 711.

If the process index is not within parameters of the reference fingerprint (block 705), the server classifies the sample data for the chamber/recipe combination as abnormal at block 709 and provides the classification, for example, to a system and/or a user at block 711. The server can provide the classification via a GUI, via a message and the network, etc. A system and/or user can use the classification, for example, for maintenance of a chamber, chamber matching, control on process chambers, etc.

At block 713, the server determines whether to provide additional data for identifying the cause for the process index not being within the parameters of the reference fingerprint. If the server should provide the additional data, the server provides the additional data at block 715. For example, the server may receive user input via a graphical user interface (GUI) to receive additional information for a particular run on the chamber and the server may provide data in the GUI for the sensors and process steps relating to the run. The additional data can include, for example, and is not limited to, contribution data for the sensors for a particular run.

Figure 8:
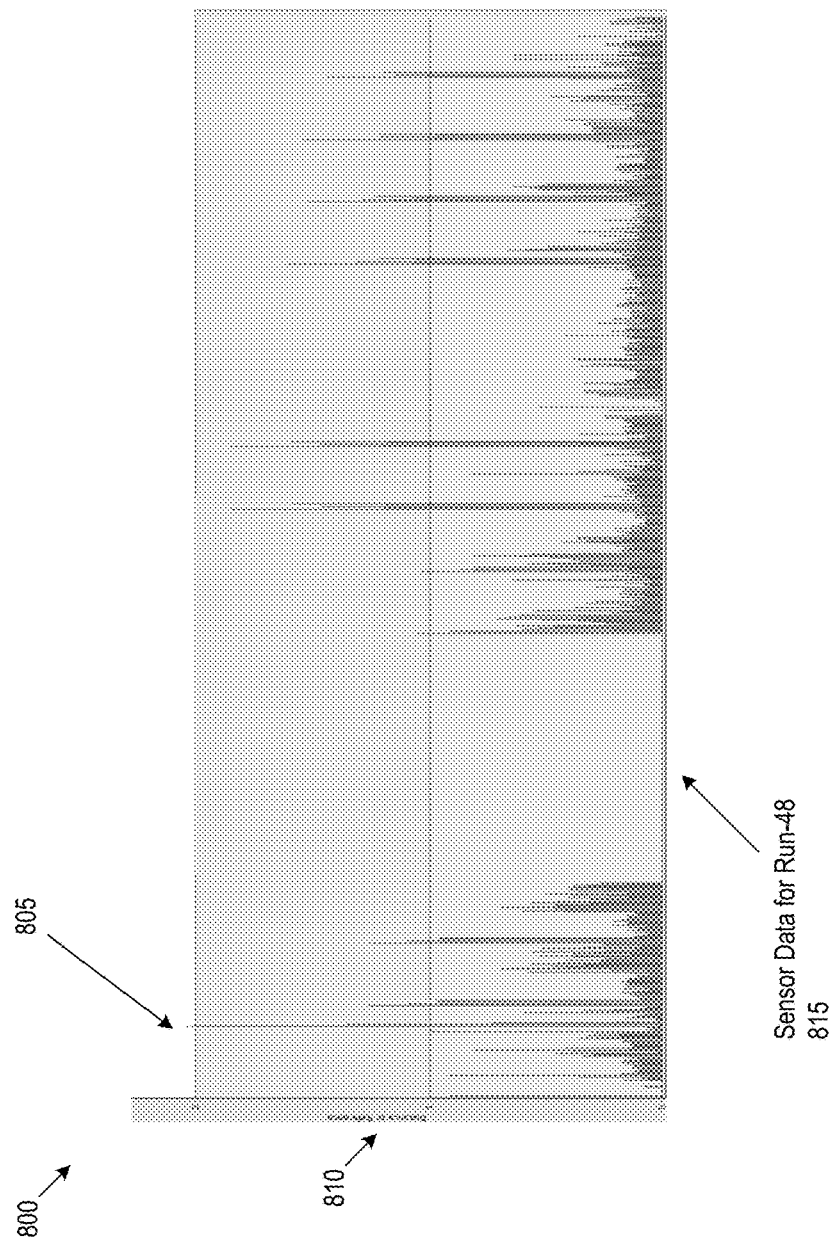
FIG. 8 illustrates an example graphical user interface including contribution data for sensors for a run of a recipe on a chamber, according to various implementations.

FIG. 8 illustrates an example graphical user interface 800 including contribution data for sensors for a run of a recipe on a chamber, according to various implementations. The tool analysis module can create a contribution vector, C, for sensors for a run of a recipe on a chamber. GUI 800 includes the contribution vector C for Run-48 for a particular chamber/recipe combination plotted as a bar chart. The contribution vector C can be a m element row vector, where each element is a contribution factor for each run for each sensor:

$C=[c_1 \ldots c_m]$ where m=sensor   Statement 5

For example, there may be four reference runs (e.g., runs 601,603,605,607 in FIG. 6) for Sensor 1 (e.g., Sensor 1 611 in FIG. 6). In one example, FIG. 6 may include the distance matrix D 609 for the unknown normalized sample vector S, with respect to the normalized reference matrix R. The contribution vector can be computed by taking each column in the distance matrix D 609 and finding the $k^{th}$ smallest value. The contribution vector $c=[c_1 \ldots c_m]$ for Sensor 1 in column 1 may be c1=[0, 1, 1, 2] and c2=[0, 1, 1, 1]. The tool analysis module can sort the elements in the contribution vector c from smallest to greatest value. Assuming k=3, C=[1,1], which describes that Sensor 1 611 in the unknown sample is one unit away from the reference set and Sensor 2 613 is one unit away from the reference set. The neighborhood vector N can describe now many units a sample is from the reference fingerprint and the contribution vector C can describe the factors for causing any deviation of neighborhood vector N from the reference fingerprint.

Returning to FIG. 8, GUI 800 can include an x-axis that describes the sensors for the particular run. For example, the x-axis may describe the sensor data for Run-48 815. The GUI 800 can include a y-axis 810 that describes distance between data being analyzed and the reference fingerprint. The tool analysis module can use the distance matrix D to compute the contribution vector C. There may be multiple types of contribution vector C, including, for example, and not limited to, a maximum contribution type, an element contribution type, and a $k^{th}$ element contribution type.

For a $k^{th}$ element contribution type, each element in vector C is the contribution for the corresponding sensor. A distance value that is less than or equal to one can indicate that the sensor contributes to the sample data falling within the reference fingerprint. A distance value that is greater than one but less than or equal to two can trigger a warning to further investigate and/or monitor the sensor. A distance value that is greater than two can indicate that the sensor likely contributes to the sample data not falling within the reference fingerprint. For example, the distance value 805 is greater than two and can indicate that the corresponding sensor is a contributor to the sample data not being within the parameters of a reference fingerprint. In one implementation, the larger the value, the greater the difference between the sensor and the reference fingerprint.

Figure 9:
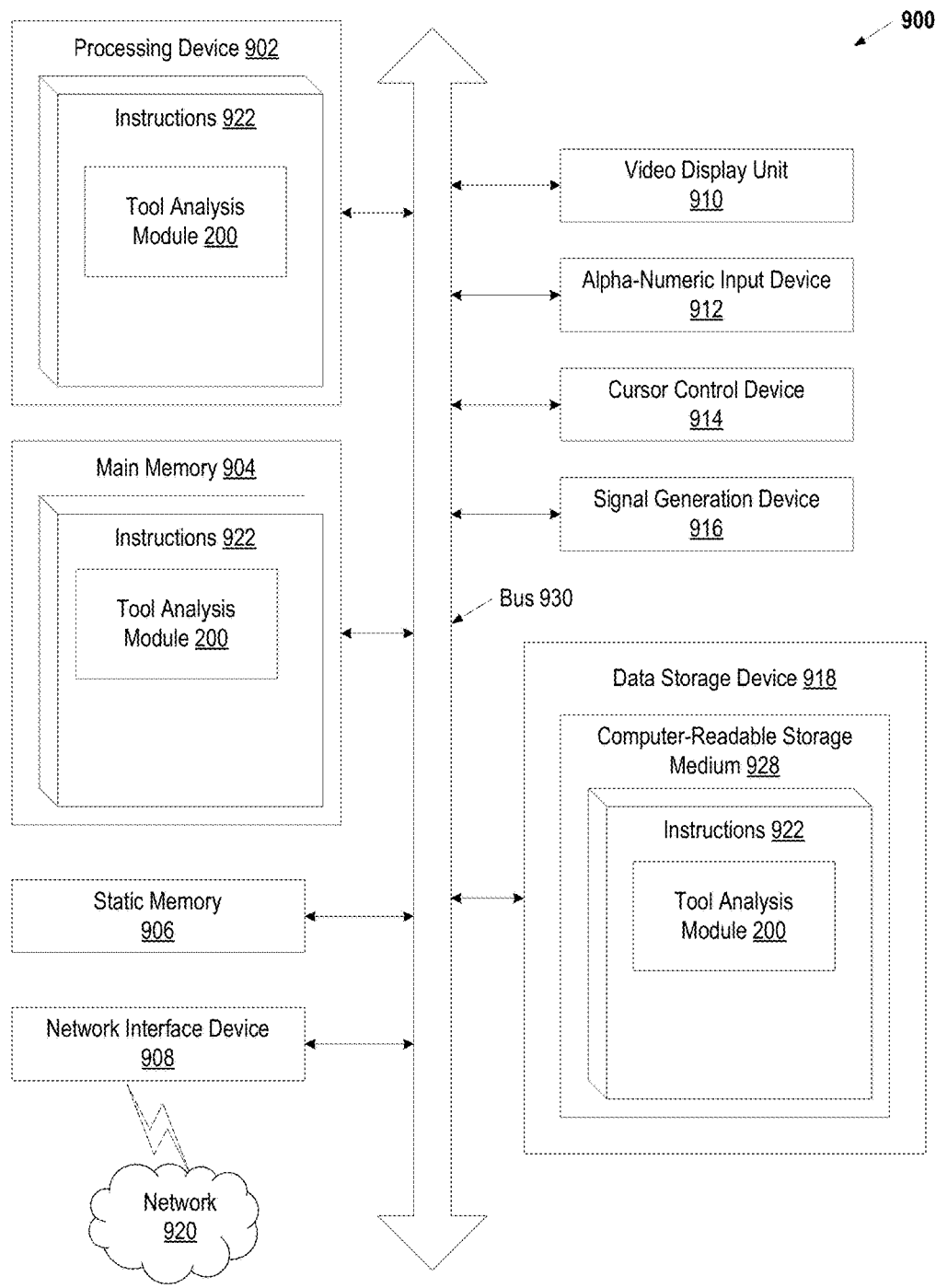
FIG. 9 is a block diagram of an example computing device that may perform one or more of the operations of a tool analysis module described herein, in accordance with various implementations.

FIG. 9 is a block diagram of an example computing device that may perform one or more of the operations of a tool analysis module described herein, in accordance with various implementations. In one implementation, the computing device corresponds to a computing device hosting a tool analysis module 200 of FIG. 2. The computing device 900 includes a set of instructions for causing the machine to perform any one or more of the methodologies discussed herein. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer device 900 includes a processing system (e.g., processing device 902), a main memory 904 (e.g., read-only memory (ROM), flash memory, dynamic random access memory (DRAM) such as synchronous DRAM (SDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute the tool analysis module 200 for performing the operations and steps discussed herein.

The computing device 900 may further include a network interface device 908. The computing device 900 also may include a video display unit 910 (e.g., a liquid crystal display (LCD) or a cathode ray tube (CRT)), an alpha-numeric input device 912 (e.g., a keyboard), a cursor control device 914 (e.g., a mouse), and a signal generation device 916 (e.g., a speaker).

The data storage device 918 may include a computer-readable storage medium 928 on which is stored one or more sets of instructions (e.g., instructions of tool analysis module 200) embodying any one or more of the methodologies or functions described herein. The tool analysis module 200 may also reside, completely or at least partially, within the main memory 904 and/or within the processing device 902 during execution thereof by the computing device 900, the main memory 904 and the processing device 902 also constituting computer-readable media. The tool analysis module 200 may further be transmitted or received over a network 920 via the network interface device 908.

While the computer-readable storage medium 928 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a result. The operations are those using physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "creating," "determining," "providing," "identifying," "defining," or the like, refer to the actions and processes of a computing device, or similar electronic computing device, that manipulates and transforms data represented as physical (e.g., electronic) quantities within the computer system's registers and memories into other data similarly represented as physical quantities within the computer system memories or registers or other such information storage devices.

Implementations of the disclosure also relate to an apparatus for performing the operations herein. This apparatus may be specially constructed for the stated purposes, or it may comprise a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   creating a reference fingerprint for a first semiconductor processing tool running a recipe using reference data pertaining to the first semiconductor processing tool performing within parameters associated with running the recipe and a plurality of nearest neighbor values determined from the reference data, the reference fingerprint comprising a target baseline and a plurality of allowable ranges based on the target baseline;
   determining whether sample data associated with a second semiconductor processing tool running the recipe is within the reference fingerprint by calculating a distance between a portion of the sample data and a corresponding portion of the target baseline of the reference fingerprint, the second semiconductor processing tool being the first semiconductor processing tool or another semiconductor processing tool of a same type as the first semiconductor processing tool, and the sample data corresponding to data from a plurality of sensors of the second semiconductor processing tool running the recipe;
   providing a classification of the second semiconductor processing tool to at least one of a system or a user based on the calculated distance and the plurality of allowable ranges based on the target baseline, the classification indicating whether the second semiconductor processing tool is performing within the reference fingerprint;
   responsive to the classification indicating that the second semiconductor processing tool is not performing within the reference fingerprint, identifying a sensor from the plurality of sensors of the second semiconductor processing tool contributing to a deviation of the calculated distance from the plurality of allowable ranges and a process step of the second semiconductor processing tool running the recipe when the identified sensor contributes to the deviation; and
   using the classification and the identification of the sensor to provide maintenance for the second semiconductor processing tool.

2. The method of claim 1, further comprising:
   identifying one or more deviations between the sample data and the reference fingerprint;
   determining that the second semiconductor processing tool is not performing within the parameters based on the one or more deviations; and
   providing additional data to identify a cause of the second semiconductor processing tool not performing within the parameters.

3. The method of claim 2, wherein the additional data comprises contribution data describing contribution of the plurality of sensors of the second semiconductor processing tool.

4. The method of claim 1, wherein the classification is normal when the sample data is within the reference fingerprint and the classification is abnormal when the sample data is not within the reference fingerprint.

5. The method of claim 1, wherein creating the reference fingerprint comprises:
   creating a vector of the plurality of nearest neighbor values using the reference data, wherein the vector indicates performance of a plurality of sensors for the first semiconductor processing tool for the recipe;
   determining a target value from the vector, wherein the target value represents an expected performance of the plurality of sensors;
   determining the allowable ranges for the expected performance of the plurality of sensors based on the target value; and
   defining the reference fingerprint as the target value and the plurality allowable ranges.

6. The method of claim 5, wherein determining the target value comprises:
   determining a mean of the plurality of nearest neighbor values in the vector.

7. The method of claim 5, wherein determining the allowable ranges comprises:
   determining one or more standard deviations from the target value.

8. A system comprising:
   a memory; and
   a processing device, coupled with the memory, to:
   create a reference fingerprint for a first semiconductor processing tool running a recipe using reference data pertaining to the first semiconductor processing tool performing within parameters associated with running the recipe and a plurality of nearest neighbor values determined from the reference data, the reference fingerprint comprising a target baseline and a plurality of allowable ranges based on the target baseline;
   determine whether sample data associated with a second semiconductor processing tool running the recipe is within the reference fingerprint by calculating a distance between a portion of the sample data and a corresponding portion of the target baseline of the reference fingerprint, the second semiconductor processing tool being the first semiconductor processing tool or another semiconductor processing tool of a same type as the first semiconductor processing tool, and the sample data corresponding to data from a plurality of sensors of the second semiconductor processing tool running the recipe;
   provide a classification of the second semiconductor processing tool to at least one of a system or a user based on the calculated distance and the plurality of allowable ranges based on the target baseline, the classification indicating whether the second semiconductor processing tool is performing within the reference fingerprint;

responsive to the classification indicating that the second semiconductor processing tool is not performing within the reference fingerprint, identify a sensor from the plurality of sensors of the second semiconductor processing tool contributing to a deviation of the calculated distance from the plurality of allowable ranges and a process step of the second semiconductor processing tool running the recipe when the identified sensor contributes to the deviation; and use the classification and the identification of the sensor to provide maintenance for the second semiconductor processing tool.

9. The system of claim 8, wherein the processing device is further to:

identify one or more deviations between the sample data and the reference fingerprint;

determine that the second semiconductor processing tool is not performing within the parameters based on the one or more deviations; and provide additional data to identify a cause of the second semiconductor processing tool not performing within the parameters, wherein the additional data comprises contribution data describing contribution of the plurality of sensors of the second semiconductor processing tool.

10. The system of claim 8, wherein the classification is normal when the sample data is within the reference fingerprint and the classification is abnormal when the sample data is not within the reference fingerprint.

11. The system of claim 8, wherein to create the reference fingerprint comprises the processing device to:

create a vector of the plurality of nearest neighbor values using the reference data, wherein the vector indicates performance of a plurality of sensors for the first semiconductor processing tool for the recipe;

determine a target value from the vector, wherein the target value represents an expected performance of the plurality of sensors;

determine the allowable ranges for the expected performance of the plurality of sensors based on the target value; and define the reference fingerprint as the target value and the allowable ranges.

12. The system of claim 11, wherein to determine the target value comprises the processing device to:

determine a mean of the plurality of nearest neighbor values in the vector.

13. The system of claim 11, wherein to determine the allowable ranges comprises the processing device to:

determine one or more standard deviations from the target value.

14. A non-transitory computer readable storage medium including instructions that, when executed by a processing device, cause the processing device to perform operations comprising:

creating, by the processing device, a reference fingerprint for a first semiconductor processing tool running a recipe using reference data pertaining to the first semiconductor processing tool performing within parameters associated with running the recipe and a plurality of nearest neighbor values determined from the reference data, the reference fingerprint comprising a target baseline and a plurality of allowable ranges based on the target baseline;

determining whether sample data associated with a second semiconductor processing tool running the recipe is within the reference fingerprint by calculating a distance between a portion of the sample data and a corresponding portion of the target baseline of the reference fingerprint, the second semiconductor processing tool being the first semiconductor processing tool or another semiconductor processing tool of a same type as the first semiconductor processing tool, and the sample data corresponding to data from a plurality of sensors of the second semiconductor processing tool running the recipe;

providing a classification of the second semiconductor processing tool to at least one of a system or a user based on calculated distance and the plurality of allowable ranges based on the target baseline, the classification indicating whether the second semiconductor processing tool is performing within the reference fingerprint;

responsive to the classification indicating that the second semiconductor processing tool is not performing within the reference fingerprint, identifying a sensor from the plurality of sensors of the second semiconductor processing tool contributing to a deviation of the calculated distance from the plurality of allowable ranges and a process step of the second semiconductor processing tool running the recipe when the identified sensor contributes to the deviation; and using the classification and the identification of the sensor to provide maintenance for the second semiconductor processing tool.

15. The non-transitory computer readable storage medium of claim 14, the operations further comprising:

identifying one or more deviations between the sample data and the reference fingerprint;

determining that the second semiconductor processing tool is not performing within the parameters based on the one or more deviations; and providing additional data to identify a cause of the second semiconductor processing tool not performing within the parameters.

16. The non-transitory computer readable storage medium of claim 15, wherein the additional data comprises contribution data describing contribution of the plurality of sensors of the second semiconductor processing tool.

17. The non-transitory computer readable storage medium of claim 14, wherein the classification is normal when the sample data is within the reference fingerprint and the classification is abnormal when the sample data is not within the reference fingerprint.

18. The non-transitory computer readable storage medium of claim 14, wherein creating the reference fingerprint comprises:

creating a vector of the plurality of nearest neighbor values using the reference data, wherein the vector indicates performance of a plurality of sensors for the first semiconductor processing tool for the recipe;

determining a target value from the vector, wherein the target value represents an expected performance of the plurality of sensors;

determining the allowable ranges for the expected performance of the plurality of sensors based on the target value; and defining the reference fingerprint as the target value and the one or more allowable ranges.

19. The non-transitory computer readable storage medium of claim 18, wherein determining the target value comprises:
   determining a mean of the plurality of nearest neighbor values in the vector.

20. The non-transitory computer readable storage medium of claim 18, wherein determining the allowable ranges comprises:
   determining one or more standard deviations from the target value.

* * * * *